United States Patent
Craig

[15] 3,655,274
[45] Apr. 11, 1972

[54] GRAVITY OPERATED LIQUID PRISM

[72] Inventor: Dwin R. Craig, Gaithersburg, Md.
[73] Assignee: Ingenuics, Inc., Gaithersburg, Md.
[22] Filed: May 7, 1970
[21] Appl. No.: 35,458

[52] U.S. Cl............................................350/286, 356/249
[51] Int. Cl......................................................G02b 5/06
[58] Field of Search..................350/286, 287, 179, 180; 356/249

[56] References Cited

UNITED STATES PATENTS 3,242,792   3/1966   Guillant..............................356/249

FOREIGN PATENTS OR APPLICATIONS 1,356,208   2/1964   France...............................350/286
1,254,479   1/1961   France...............................356/249

*Primary Examiner*—David Schonberg
*Assistant Examiner*—Ronald J. Stern
*Attorney*—Elton H. Brown, Jr.

[57] ABSTRACT

A gravity operated liquid prism attached to an optical system intended for vertical orientation either up or down. The liquid prism includes a floating boat which moves with the liquid to remain horizontal when the other surface follows the mechanical motion in any direction of its support thus forming an optical wedge which deviates the optical axis of the system.

2 Claims, 3 Drawing Figures

Patented April 11, 1972 3,655,274

OPTICAL AXIS

OPTICAL AXIS

INVENTOR
DWIN R. CRAIG,

BY

//PATENT_NUMBER: 3,655,274

GRAVITY OPERATED LIQUID PRISM

BACKGROUND OF THE INVENTION

FIELD OF THE INVENTION

The present invention relates to a gravity operated liquid prism for use with optical systems extending on a vertical axis.

SUMMARY OF THE INVENTION

The present invention is directed to a gravity operated liquid prism which will optically compensate for mechanical motions of the system out of vertical.

The primary object of the invention is to provide an automatic optical compensating system which will correct errors developed in an optical system by movement of the system out of a vertical alignment.

Other objects and advantages will become apparent in the following specification when considered in the light of the attached drawings.

DESCRIPTION OF THE PREFERRED EMBODIMENT

Figures 1, 2, 3:
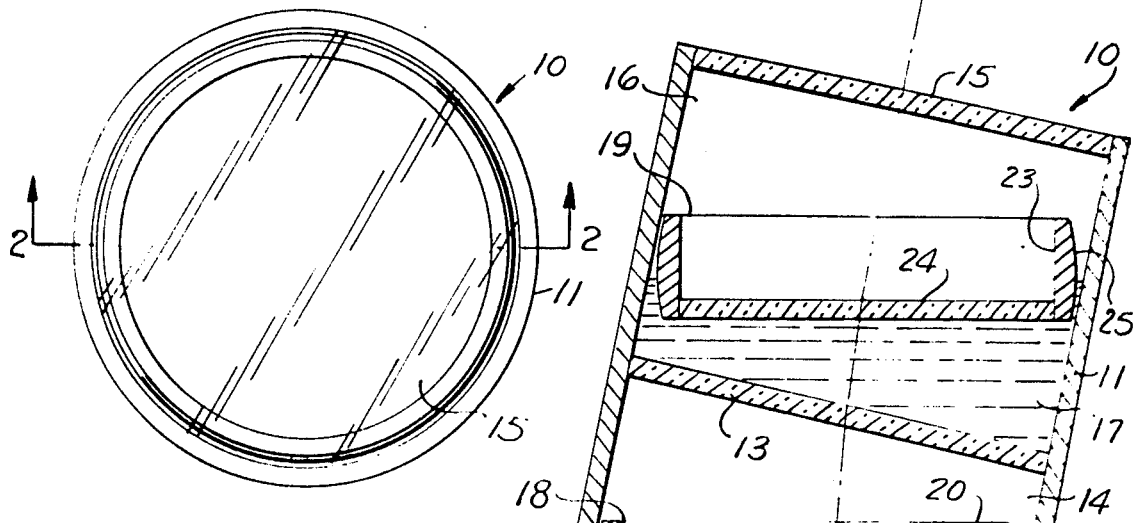
FIG. 1 is a top plan view of the invention.
FIG. 2 is a vertical sectional view taken along the line 2—2 of FIG. 1 looking in the direction of the arrows.
FIG. 3 is a view similar to FIG. 2 with the invention tilted 10°.

Referring now to the drawings in detail wherein like reference characters indicate like parts throughout the several figures the reference numeral 10 indicates generally a gravity operated liquid prism constructed in accordance with the invention.

The gravity operated liquid prism 10 includes an opaque cylindrical container 11 preferably formed of metal. An optically flat circular glass plate 12 forms a bottom wall for the container 11 and is sealed thereto. An optical flat circular glass plate 13 forms a horizontal partition in the container 11 intermediate the upper and lowers ends thereof. The partition 13 is sealed to the container 11 to form a lower chamber 14. An optically flat circular glass plate 15 forms a top wall for the container 11 and is sealed thereto forming an upper chamber 16.

The liquid 17 partially fills the lower chamber 14 and the upper chamber 16. The liquid 17 will be described in detail below.

A boat 18 is positioned in the chamber 14 floating on the liquid 17 and a boat 19 is positioned in the chamber 16 floating on the liquid 17 therein. The boat 18 includes a ring 20 having an optically flat circular glass plate 21 extending thereacross and sealed thereto to form a bottom for the boat 18. The ring 20 has an outer wall 22 which is a section of a surface of a sphere having a radius slightly less than the inner radius of the cylindrical container 11.

The boat 19 includes a ring 23 having an optically flat circular glass plate 24 sealed thereto to form a bottom for the boat 19. The outer wall 25 of the ring 23 is the surface of a sphere having a radius slightly smaller than the inner radius of the cylindrical container 11.

The instant invention is a gravity operated liquid prism which may be attached to any optical system intended for vertical orientation up or down.

As the optical system moves in roll, pitch or any combination thereof one surface of the liquid is held horizontal by gravity and the other surface follows the mechanical motion, forming an optical wedge which deviates the optical axis of the system.

When two elements are used in series, containing a liquid whose index of refraction is 1.500, the angular deviation of the optical axis is exactly equal to the physical angular deviation of the system from vertical. Consequently, an object directly below a downward looking optical system will be imaged on the optical axis regardless of the physical angle of tilt.

The ratio of optical to mechanical angular deviation is exactly 1.00 for tilt angles from 0 to ±2° and gradually falls to a 0.98 for a tilt angle of ±10° from vertical. Also, at large angles of tilt, optical dispersion in the liquid produces different deviations for different wavelengths of light. This will produce color fringing in a panchromatic system but has no apparent effect on the image in a monochromatic system.

The instant invention is constructed of two identical cylindrical cells. The lower surface of each cell is a disc of plane, parallel optical glass. The cell is partially filled with a silicone fluid of appropriate index of refraction and viscosity.

A round glass bottom boat floats in the fluid. The side wall of the boat is curved to form a section of a sphere whose radius is slightly smaller than the inner radius of the cylindrical shell. The space between the boat wall and cylinder partially fills with fluid due to displacement and also to capillary action — serving as a lubricant to insure free movement of the boat.

Frequency response of the system extends from 0 cycles/second (steady state) up to about 1 cycle/second. A sudden step change of up to 10° is fully compensated in less than 1 second.

A liquid having suitable optical and physical properties for use in the instant invention is Dow Corning 550 Fluid and is a phenylmethyl silicone fluid. The properties of Fluid 550 are described in detail in Bulletin: 05–127 dated June 1965 Engineering Products Division, Dow Corning Corporation Midland, Michigan. Additional information is given in their Bulletin: 05–172 under date of Mar. 1967.

It should be understood that other fluids such as Dow Corning Fluid 710 described in the aforementioned bulletins may be mixed with Fluid 550 to regulate the refractive index of the final fluid to an exact 1.500 for extremely accurate optical systems.

The gravity operated liquid prism is useful in aerial photography view finders, as an image stabilizer (in lieu of stabilized mount) for aerial cameras, as an optical plummet (with laser) for well drilling and/or building construction, as an optical plummet for tower and tripod positioning, as an image stabilizer for zenith cameras, as an image stabilizer for ocean bottom photography from a surface or submerged vessel, and as an optical plummet (with laser) for measuring bridge sway.

Obviously other applications of the gravity operated liquid prism may be made as desired.

Having thus described the preferred embodiment of the invention it should be understood that numerous structural modifications and adaptations may be resorted to without departing from the spirit of the invention.

What is claimed is:

1. A gravity operated liquid prism comprising a cylindrical container, a pair of chambers formed in said container by three spaced apart optically flat glass plates sealed to said container, a fluid partially filling each of said chambers with said fluid having an index of refraction of substantially 1.500, a glass bottom circular boat floating on the fluid in each of said chambers for forming a variable optical wedge with said fluid and the underlying glass plate, and an upstanding side wall on each of said boats having an outer surface corresponding to a section of a surface of a sphere having a radius slightly less than the inside radius of said cylindrical container, the space between said outer surface of said side wall and the inner surface of said cylinder being sufficiently small to produce capillary action to at least partially fill said space with said fluid, said fluid serving as a lubricant between said boat and said cylinder to insure free movement of said boat in said cylinder.

2. A device as claimed in claim 1 wherein said cylindrical container is opaque.